Sept. 27, 1927.	A. W. JONES	1,643,850
SPLINT
Filed Aug. 2, 1926
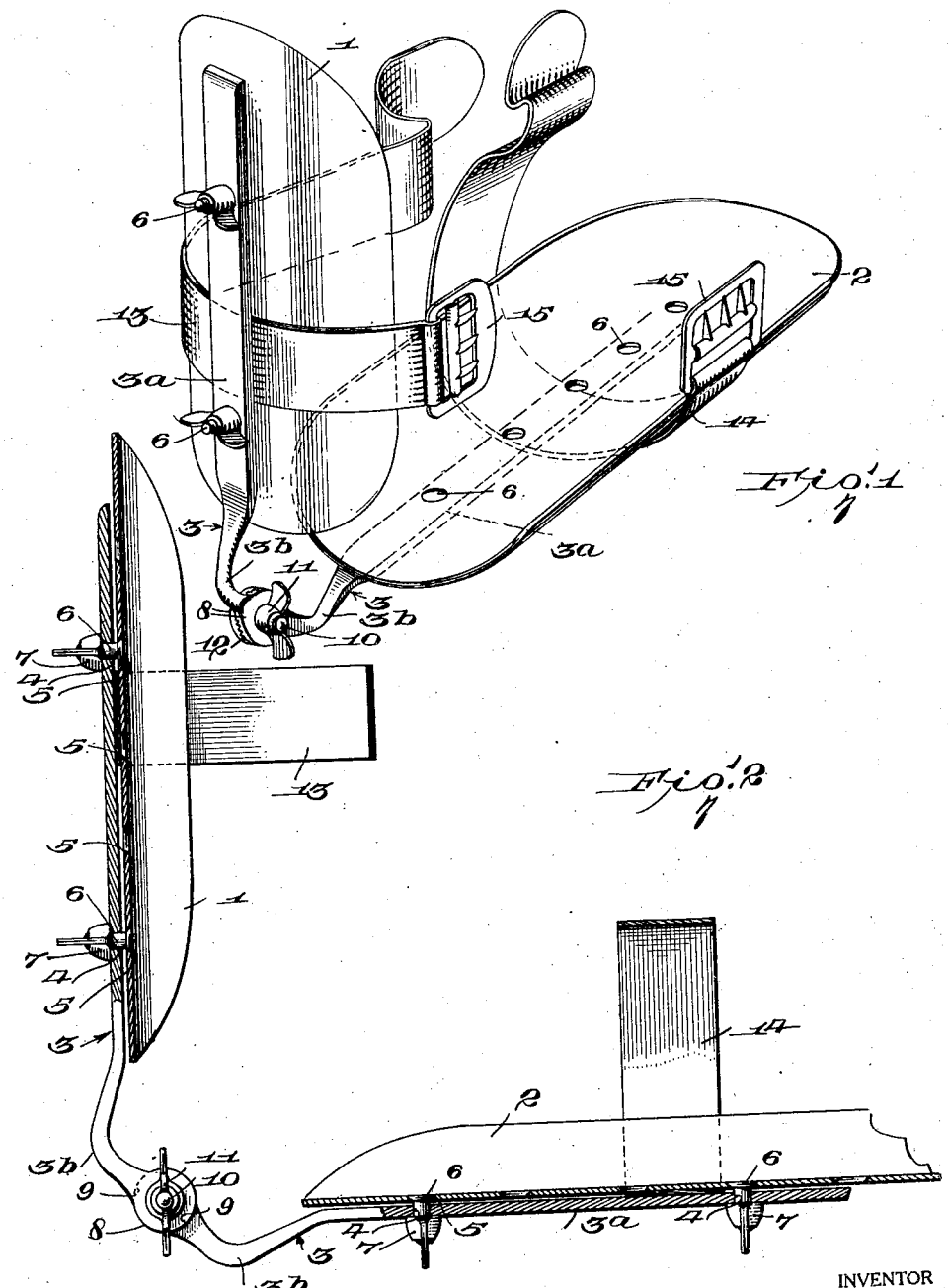
WITNESSES
M. Fowler
INVENTOR
A.W. Jones
BY
ATTORNEYS Patented Sept. 27, 1927.

1,643,850

UNITED STATES PATENT OFFICE.

ARTHUR WILLIAM JONES, OF RANDOLPH, WISCONSIN.

SPLINT.

Application filed August 2, 1926. Serial No. 126,528.

My invention relates to improvements in surgical splints for fractures, and it consists in the combinations, constructions and arrangements herein described and claimed.

A splint embodying the invention is adapted particularly for use in the treatment of fractures of the elbow, lower arm, or upper part of the forearm but also can be used to advantage in elevating the shoulder in case of fracture of the clavicle.

An object of the invention is the provision of a splint which is adjustable to vary the effective length thereof and which also can be adjusted to vary the angular relation of the supporting members thereof with respect to each other and so that such supporting members can be locked in adjusted angular relation with respect to each other.

A further object of the invention is the provision of a splint of the character described which includes a hinge having means for adjustably supporting two supporting plate members so that plate members of given sizes can be adjusted on the hinge to vary the effective length of the splint and plate members of various sizes can be used selectively with the hinge.

A still further object of the invention is the provision of a splint of the character described which can be attached to the upper arm and forearm so as to support the forearm at a desirable angle with respect to the upper arm and so as to form a guard for the elbow which will protect the elbow from injury.

Other objects and advantages of the invention will be apparent from the following description, considered in conjunction with the accompanying drawings, forming a part of this invention, in which, Figure 1 is a perspective view of a splint embodying the invention.

Figure 2 is a fragmentary vertical section through the splint.

In carrying out the invention, I make use of two supporting plates indicated at 1 and 2 respectively. Each of these supporting plates preferably is formed of aluminum and is of light gage. Each plate 1 or 2 is concavo-convex in cross sectional configuration and preferably has the end edges thereof rounded off or convexly curved as shown. The respective plates 1 and 2 may be of various lengths and widths according to the requirements for use in any given case and as will be more clearly understood from the description of the operation of the device which will hereinafter be given.

The plates 1 and 2 are adjustably connected by a hinge or bracket which comprises a pair of similar members 3. Each of the hinge members 3 has an elongated flat attaching portion $3^a$ which extends from one end of the member 3 for the greater part of the length of the member 3 and which is adapted to rest substantially flatwise against the convexly curved face of a plate 1 or 2 along the longitudinal median line of that plate. The attaching portion $3^a$ of each member 3 is formed with a plurality of longitudinally spaced openings 4 and each plate 1 or 2 also has a plurality of longitudinally spaced openings 5 which are located along the longitudinal median line of that plate.

Fastening devices such as the bolts 6 are adapted to extend through alined openings 5 and 4 of a plate 1 or 2 and the associated hinge member, respectively, and the openings 5 preferably are enlarged toward their inner ends so as to receive the head portions of the associated bolts 6. The shanks of the bolts then protrude from the openings 5 and are engaged threadedly by thumb nuts 7 which can be tightened to clamp the plates firmly to the attaching portions $3^a$ of the hinge members. It will be manifest that the plates can be adjusted along the attaching portions $3^a$ of the hinge members and secured to the attaching portions of the hinge members in any adjusted position since the plates can be moved longitudinally on the attaching portions $3^a$ of the hinge members to position the various openings 5 in register with the openings 4 selectively.

Each of the hinge members 3 has its inner end portion formed to be substantially arcuate in longitudinal sectional configuration as indicated at $3^b$ and at the inner end of the adjacent plate 1 or 2. The extreme inner end portion of each of the hinge members 3 is flattened in a plane at right angles with the plane of the substantially flat attaching portion $3^a$ of that hinge member, as indicated at 8 and is provided with a cut away portion or socket 9 in one face thereof for the reception of the flattened portion 8 of the other hinge member. The portions 8 of the hinge members are formed to be substantially circular in cross sectional configuration so that the end portion 8 of each hinge member may rotate in the socket or cut away portion 9 of the other hinge member.

The enlarged end portions 8 of the two hinge members are provided with alined central openings for the reception of a pivot member 10 which is a bolt with which a thumb nut 11 is adjustably engageable. The enlarged end portions 8 of the hinge members are provided with radial teeth 12 in their adjacent faces and such teeth will mesh with each other when the thumb nut 11 has been tightened so as to hold the hinge members in adjusted angular relation with respect to each other. However, when the thumb nut 11 has been loosened the hinge members may be swung about the axis of the pivot member or pintle 10 to another angular relation with each other and then the thumb nut 11 may be tightened again to maintain such angular relation between the hinge members.

Straps such as indicated at 13 and 14 respectively may be confined intermediate their ends between the attaching portions 3ᵃ of the hinge members and the convexly curved faces of the supporting plates so that the ends of the straps may pass beyond the side edges of the associated plates around the portions of an arm or other portions of the body with which the plates are associated. Each of the straps 13 or 14 may have a buckle 15 at one end thereof which is adjustably engageable with the opposite end portion of the strap.

From the foregoing description of the various parts of the device, the operation thereof may be readily understood. The supporting plates 1 and 2 may be secured in place on the upper arm and the forearm of the fractured arm, respectively, so that the connected-together inner end portions of the hinge members of the device will be located close to the elbow of the arm and in position to constitute a guard member for the elbow so that the elbow will be protected from injury such as might result from contact of the elbow with any object or because of a blow against the elbow. The angular relation of the respective plates can be adjusted in the manner hereinbefore described to maintain the forearm in a desirable angular relation to the upper arm of the patient and in this connection it is to be observed that the plate that is associated with the forearm preferably is connected with the associated hinge member so as to extend sufficiently far under the wrist of the patient to support the wrist and hand of the patient so that the device also acts somewhat in the nature of a sling. The straps 13 and 14, of course, are used to secure the plates to the associated portions of the fractured arm and these straps will hold the splint in place while the fracture is being rebandaged.

When the hinge members with the plates connected therewith are separated from each other the plates can be nested so as to take up but relatively little space. A plurality of plates of different lengths and widths may be provided and used selectively with the same hinge according to varying service requirements.

Obviously, the invention is susceptible of embodiment in forms other than which is illustrated in the accompanying drawings and I therefore consider as my own all such modifications and adaptations thereof as fairly fall within the scope of the appended claim.

What I claim is:

A splint comprising a pair of supporting plates, a hinge comprising a pair of elongated members having substantially flat attaching portions extending from the outer ends of said hinge members for the greater part of the length of said hinge members, and means adjustably and detachably connecting said plates with said attaching portions of said hinge members in respect to longitudinal relation, the remaining portions of said hinge members being curved longitudinally substantially along the arc of a circle and having their extremities enlarged and flattened in planes at right angles with the planes of said substantially flat elongated attaching portions of the hinge members, said enlarged end portions of the hinge members having sockets in their adjacent faces, each adapted to receive the enlarged end portion of the other hinge member, said enlarged end portions of the hinge members having alined central openings, a bolt extending through said alined openings, a thumb nut engageable with said bolt, said enlarged end portions of the hinge members having radial teeth on their adjacent faces adapted to mesh with each other when said thumb nut has been tightened.

ARTHUR WILLIAM JONES.